United States Patent
Kang et al.

(10) Patent No.: US 10,079,697 B1
(45) Date of Patent: Sep. 18, 2018

(54) RECEIVING DEVICE AND SIGNAL CONVERSION METHOD

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Wen-Juh Kang, Hsinchu (TW); Yu-Chu Chen, Hsinchu (TW); Yi-Lin Lee, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/859,751

(22) Filed: Jan. 2, 2018

(30) Foreign Application Priority Data

Jul. 25, 2017 (CN) .......................... 2017 1 0609458

(51) Int. Cl.
*H04L 25/03* (2006.01)

(52) U.S. Cl.
CPC .............................. *H04L 25/03019* (2013.01)

(58) Field of Classification Search
CPC ............... H04L 25/03; H04L 25/03006; H04L 25/03012; H04L 25/03019; H04L 25/03057; H04L 25/03076; H04L 25/03082; H04L 25/03108
USPC .......................... 375/229, 230, 232, 233, 236
See application file for complete search history.

(56) References Cited

U.S. PATENT DOCUMENTS

| | | | |
|---|---|---|---|
| 9,350,572 B1 * | 5/2016 | Kang | H04L 7/033 |
| 9,397,867 B1 * | 7/2016 | Azenkot | H04L 25/03019 |
| 9,401,800 B1 * | 7/2016 | Kang | H04L 7/0062 |
| 9,438,450 B1 * | 9/2016 | Kang | H04L 25/03885 |
| 9,455,848 B1 * | 9/2016 | Zhang | H04L 25/03057 |
| 9,479,366 B2 | 10/2016 | Zheng | |
| 2010/0046683 A1 | 2/2010 | Beukema et al. | |
| 2012/0033685 A1 * | 2/2012 | Doblar | H04L 25/03057 370/535 |
| 2015/0256364 A1 * | 9/2015 | Mobin | H04L 25/03057 375/233 |
| 2016/0065394 A1 * | 3/2016 | Sindalovsky | H04L 25/03012 375/371 |

\* cited by examiner

*Primary Examiner* — Siu Lee

(74) *Attorney, Agent, or Firm* — CKC & Partners Co., Ltd.

(57) ABSTRACT

A receiving device includes a first calculating circuit, an error slicer, a data slicer, a second calculating circuit, and an equalization circuit. The first calculating circuit is configured to generate a calculating signal according to an equalized signal and a feedback signal. The error slicer is configured to generate an error signal according to the calculating signal. The data slicer is configured to generate a data signal according to the calculating signal. The second calculating circuit is configured to generate a first, a second, and a third equalization coefficient according to the data signal and the error signal. The equalization circuit is configured to generate the feedback signal according to the first, the second, and the third equalization coefficient. A gain value of the equalization circuit is associated with the first equalization coefficient. A time constant of the equalization circuit is associated with the second and the third equalization coefficient.

14 Claims, 5 Drawing Sheets

US 10,079,697 B1

RECEIVING DEVICE AND SIGNAL CONVERSION METHOD

RELATED APPLICATION

This application claims priority to China Application Serial Number 201710609458.0, filed Jul. 25, 2017, which is herein incorporated by reference.

BACKGROUND

Field of Invention

The present application relates to an integrated circuit, and especially to a receiving device and a signal conversion method, with a mechanism of eliminating inter-symbol interference (ISI).

Description of Related Art

In a communication system, a transmitter and a receiver exchange data via a channel. Based on the characteristic of the channel, the signal received by the receiver may have distortion. Distortion will cause the inter-symbol interference (ISI). Hence, the receiver will misjudge the data.

SUMMARY

In view of this, the present disclosure provides a receiving device and a signal conversion method to solve the problem in the related art.

An embodiment of the disclosure is associated with a receiving device which includes a first calculating circuit, an error slicer, a data slicer, a second calculating circuit and an equalization circuit. The first calculating circuit is configured to generate a calculating signal according to an equalized signal and a feedback signal. The error slicer is configured to generate an error signal according to the calculating signal. The data slicer is configured to generate a data signal according to the calculating signal. The second calculating circuit configures to generate a first equalization coefficient, a second equalization coefficient and a third equalization coefficient according to the data signal and the error signal. The equalization circuit is configured to generate the feedback signal according to the first equalization coefficient, the second equalization coefficient and the third equalization coefficient. A gain value of the equalization circuit is associated with the first equalization coefficient. A time constant of the equalization circuit is associated with the second equalization coefficient and the third equalization coefficient.

An embodiment of the present disclosure is associated with a signal conversion method. The signal conversion method includes: generating a calculating signal by a first calculating circuit according to a equalized signal and a feedback signal; generating an error signal by an error slicer according to the calculating signal; generating a data signal by a data slicer according to the calculating signal; generating a first equalization coefficient, a second equalization coefficient and a third equalization coefficient by a second calculating circuit according to the data signal and the error signal; and generating the feedback signal by a equalization circuit according to the first equalization coefficient, the second equalization coefficient and the third equalization coefficient. A gain value of the equalization circuit is associated with the first equalization coefficient. A time constant of the equalization circuit is associated with the second equalization coefficient and the third equalization coefficient.

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
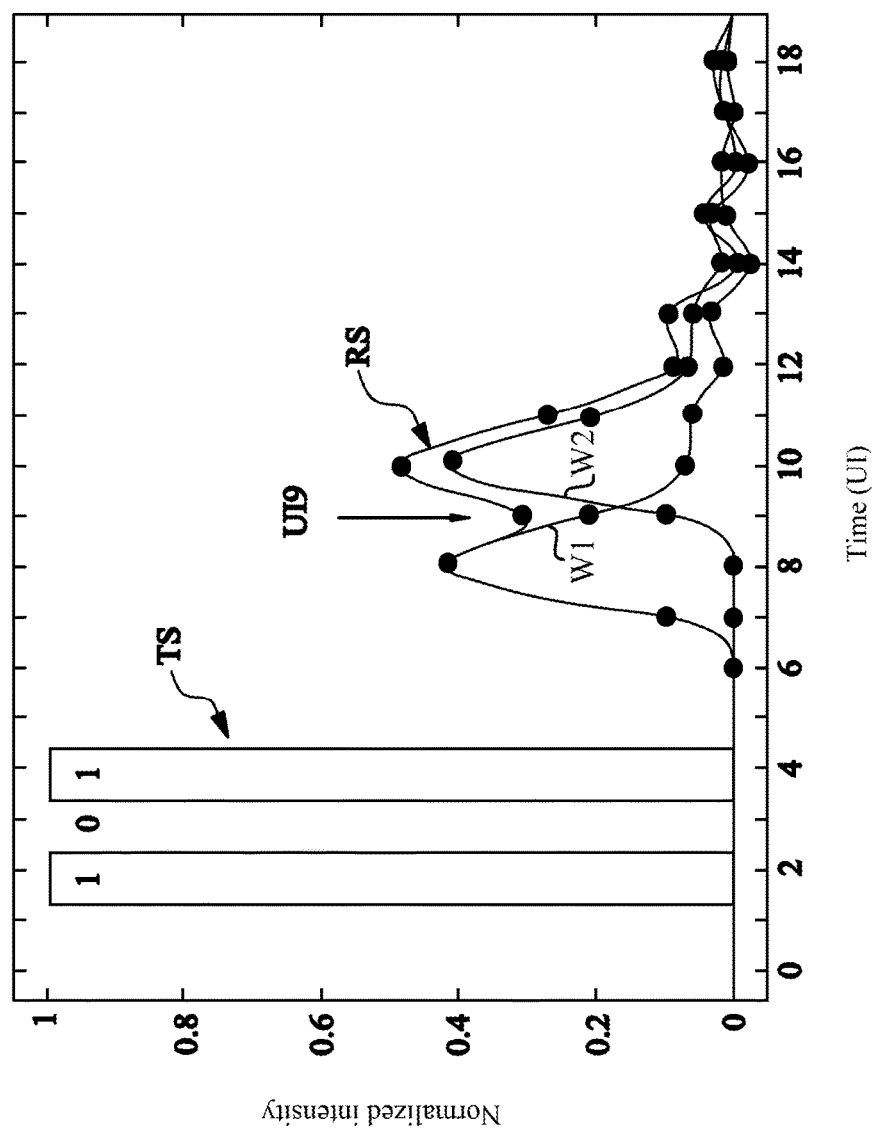
FIG. 1 is a schematic diagram illustrating the inter-symbol interference according to some embodiments of the present disclosure.

Reference is made to FIG. 1. FIG. 1 is a schematic diagram illustrating an inter-symbol interference according to some embodiments of the present disclosure. In some embodiments, a transmitting device transmits a transmitted signal TS to a receiving device (e.g., a receiving device 200 shown in FIG. 2) via a channel. The transmitted signal TS becomes a received signal RS after transmission via the channel. The received signal RS is received by the receiving device.

For illustration in FIG. 1, the transmitted signal TS includes two square waves. In other words, the transmitted signal TS includes three symbols. These symbols correspond to logic "1", logic "0", logic "1," respectively. In some embodiments, a data interval between any two adjacent symbols is defined as an unit interval (UI). Based on the channel's characteristic, each square wave will become a slow rising and slow falling waveform. For example, the first square wave will become a waveform W1, and the second square wave will become a waveform W2. Hence, the received signal RS (e.g., the superimposition result of the waveform W1 and the waveform W2) is generated and will cause the inter-symbol interference (ISI). According to FIG. 1, because of the inter-symbol interference, the received signal RS will be read as logic "1", logic "1", logic "1". In other words, a data located at a time U19 will be misjudged.

Figure 2:
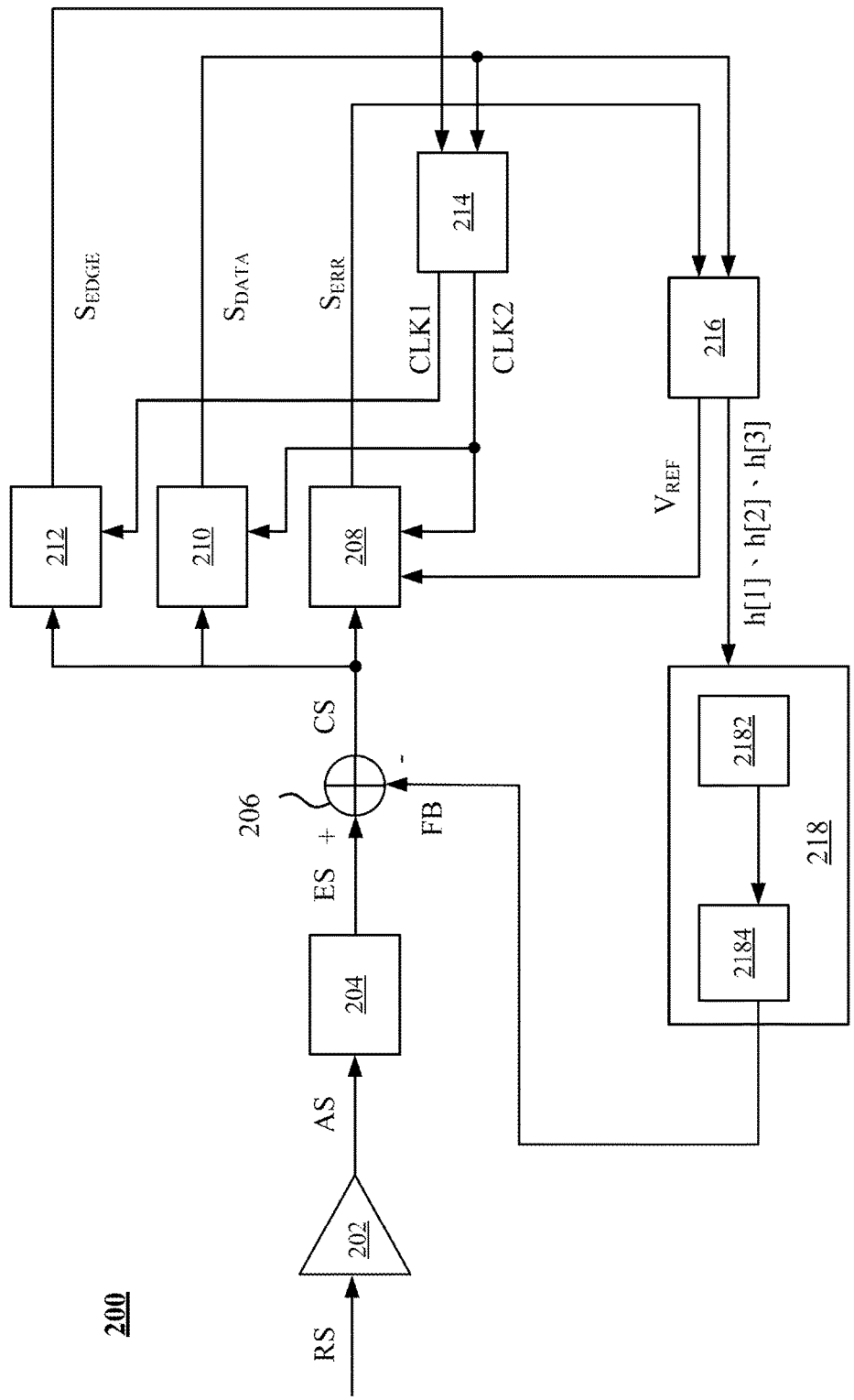
FIG. 2 is a schematic diagram illustrating a receiving device according to some embodiments of the present disclosure.

Reference is made to FIG. 2. FIG. 2 is a schematic diagram illustrating a receiving device 200 according to some embodiments of the present disclosure.

In some embodiments, the receiving device 200 includes an amplifier 202, an equalizer 204, a calculating circuit 206, an error slicer 208, a data slicer 210, an edge slicer 212, a clock data recovery circuit 214, a calculating circuit 216 and an equalization circuit 218.

In some embodiments, the amplifier 202 is configured to generate an amplified signal AS according to the received signal RS. For example, the amplifier 202 amplifies the received signal RS to output the amplified signal AS. In some embodiments, the amplifier 202 is implemented by a variable gain amplifier (VGA). Various components which can implement the amplifier 202 are within the contemplated scope of the present disclosure.

In some embodiments, the equalizer 204 is configured to generate an equalized signal ES according to the amplified signal AS. For example, the equalizer 204 equalizes the amplified signal AS to output the equalized signal ES. In some embodiments, the equalizer 204 is implemented by a continuous time linear equalizer (CTLE). Various components which can implement the equalizer 204 are within the contemplated scope of the present disclosure.

In some embodiments, the calculating circuit 206 is configured to generate a calculating signal CS according to the equalized signal ES and a feedback signal FB. In some embodiments, the calculating circuit 206 is a implement of an adder. For example, the calculating circuit 206 subtracts the feedback signal FB from the equalized signal ES to output the calculating signal CS. Various components which can implement the calculating circuit 206 are within the contemplated scope of the present disclosure.

In some embodiments, the error slicer 208 is configured to generate an error signal $S_{ERR}$ according to a calculating signal CS. In some embodiments, the error slicer 208 is configured to output the error signal $S_{ERR}$ by comparing the calculating signal CS with a reference voltage $V_{REF}$. For example, when the voltage of one of symbols of the calculating signal CS is higher than the reference voltage $V_{REF}$, a corresponding symbol of the error signal $S_{ERR}$ will be set as "+1". Correspondingly, when the voltage of one of the symbols is lower than the reference voltage $V_{REF}$, the corresponding symbol will be set as "−1". Therefore, the error signal $S_{ERR}$ is generated. In some embodiments, the error slicer 208 operates based on a clock signal CLK2.

In some embodiments, the data slicer 210 is configured to generate a data signal $S_{DATA}$ according to the calculating signal CS. In some embodiments, the data slicer 210 is configured to compare the calculating signal CS with a middle voltage to output the data signal $S_{DATA}$. In some embodiments, the middle voltage is lower than the reference voltage $V_{REF}$. For example, when the voltage of any one of symbols of the calculating signal CS is higher than the middle voltage, a corresponding symbol of the data signal $S_{DATA}$ will be set as logic "1". Correspondingly, when the voltage of one of the symbols is lower than the middle voltage, the corresponding symbol will be set as logic "0". Therefore, the data signal $S_{DATA}$ is generated. In some embodiments, the data slicer 210 operates based on a clock signal CLK2.

In some embodiments, the calculating circuit 216 is configured to generate an equalization coefficient h[1], an equalization coefficient h[2] and an equalization coefficient h[3] according to the data signal $S_{DATA}$ and the error signal $S_{ERR}$. In some embodiments, the calculating circuit 216 performs an adaptive algorithm on the data signal $S_{DATA}$ and the error signal $S_{ERR}$ to obtain the equalization coefficient h[1], the equalization coefficient h[2] and the equalization coefficient h[3]. The adaptive algorithm is, for example, least mean square (LMS) algorithm, and the calculating circuit 216 includes, for example, a multiplier and an adder circuit. Various algorithms are within the contemplated scope of the present disclosure. The calculating circuit 216 is implemented with an algorithm.

In some embodiments, the equalization circuit 218 is configured to generate the feedback signal FB according to the equalization coefficient h[1], the equalization coefficient h[2] and the equalization coefficient h[3]. In some embodiments, an impulse response of the equalization circuit 218 is associated with the equalization coefficient h[1], the equalization coefficient h[2] and the equalization coefficient h[3].

In some embodiments, the equalization circuit 218 includes a filter circuit 2182 and a digital to analog convertor 2184.

In some embodiments, the filter circuit 2182 includes a resistor-capacitor (RC) circuit. The resistor-capacitor circuit generates feedback signal FB with impulse response time corresponding to the time constant of RC value. In some embodiments, the time constant is associated with the equalization coefficient h[2] and the equalization coefficient h[3]. In some embodiments, the time constant is determined by the equalization coefficient h[2] and the equalization coefficient h[3]. In some embodiments, the digital to analog convertor 2184 corresponds to a gain value. In some embodiments, the gain value is associated with the equalization coefficient h[1]. In some embodiments, the gain value is determined by the equalization coefficient h[1].

In some embodiments, the equalization circuit 218 is configured to generate the feedback signal FB according to the time constant and the gain value. A generation method of the feedback signal FB will be described in detail in the following section. In some embodiments, the feedback signal FB is an analog signal. As mentioned before, the calculating circuit 206 subtracts the feedback signal FB from the equalized signal ES to output the calculating signal CS. In some embodiments, the equalization circuit 218 is implemented by an infinite impulse response/decision feedback equalizer (IIR/DEF). Various components which can implement the equalization circuit 218 are within the contemplated scope of the present disclosure.

Figure 3:
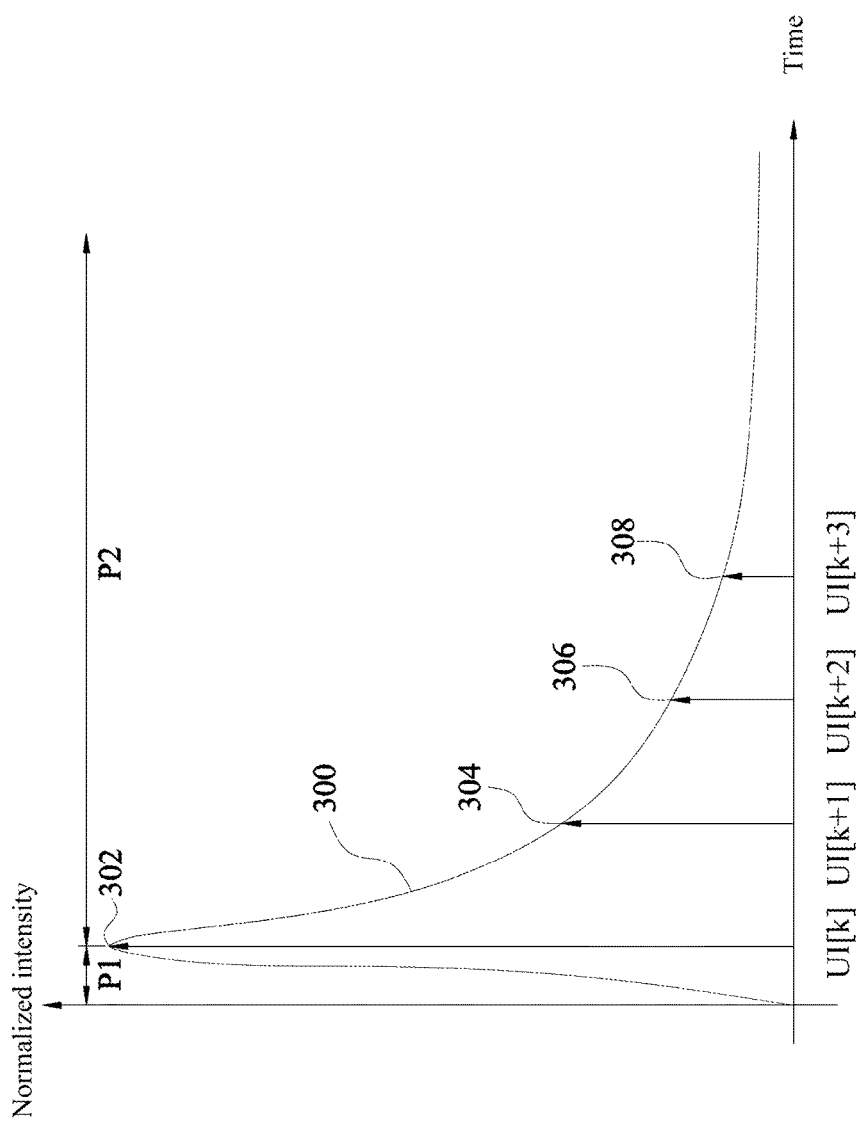
FIG. 3 is a schematic diagram illustrating the equalized signal shown in FIG. 1 according to some embodiments of the present disclosure.

Reference is made to FIG. 3. FIG. 3 is a schematic diagram illustrating the equalized signal ES shown in FIG. 2 according to some embodiments of the present disclosure. In some embodiments, a signal 300 is the equalized signal ES shown in FIG. 1. In some embodiments, the signal 300 corresponds to one of the symbols of the equalized signal ES. The signal 300 shown in FIG. 3 is only given for illustrative purposes. Various waveform of the equalized signal ES are within the contemplated scope of the present disclosure.

In some embodiments, the signal 300 includes a location 302, a location 304, a location 306 and a location 308. The location 302 corresponds to a peak value of the signal 300. The location 302 corresponds to a peak time UI[k].

In some embodiments, the location 304 corresponds to a time UI[k+1]. The location 306 corresponds to a time UI[K+2]. The location 308 corresponds to a time UI[K+3]. In some embodiments, the time UI[k+1] and the time UI[k] have an unit interval (UI) therebetween. Correspondingly, the time UI[k+2] and the time UI[k+1] have the unit interval (UI) therebetween. The time UI[k+3] and the time UI[k+2] have the unit interval (UI) therebetween. In some embodiments, a value at the location 304 is viewed as the equalization coefficient h[1]. A value at the location 306 is viewed as the equalization coefficient h[2]. A value at the location 308 is viewed as the equalization coefficient h[3].

In some embodiments, a part (rising edge) before the location 302 of the signal 300 is viewed as a pre-cursor P1, and a part (falling edge) after the location 302 of the signal 300 is viewed as a post-cursor P2. Equivalently, the equalization coefficient h[1], the equalization coefficient h[2] and the equalization coefficient h[3] locate at the post-cursor P2 of the signal 300.

Because the post-cursor P2 of the signal 300 and the pre-cursor of the next symbol will cause the inter-symbol interference, the post-cursor P2 of the signal 300 should be eliminated appropriately to avoid data misjudgment.

Figure 4:
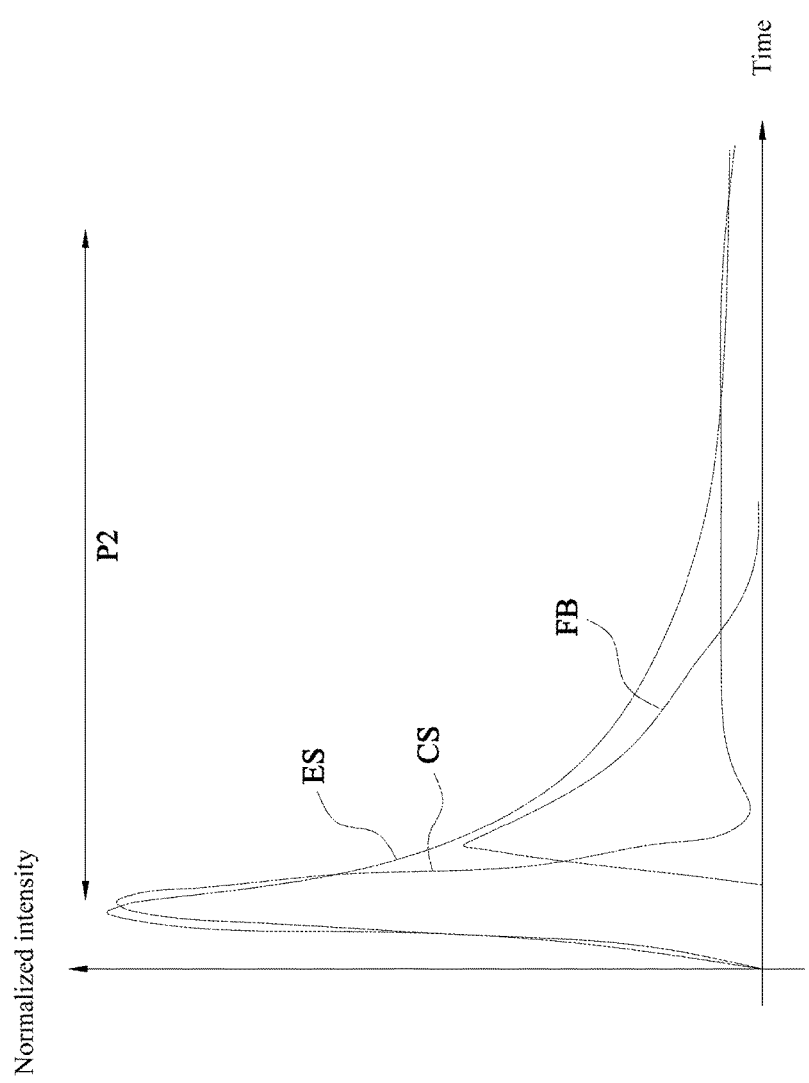
FIG. 4 is a schematic diagram illustrating the equalized signal, the feedback signal and the calculating signal shown in FIG. 1 according to some embodiments of the present disclosure.

Reference is made to FIG. 4. FIG. 4 is a schematic diagram illustrating the equalized signal ES, the feedback signal FB and the calculating signal CS shown in FIG. 2, according to some embodiments of the present disclosure. The equalized signal ES, the feedback signal FB and the calculating signal CS shown in FIG. 4 are only given for illustrative purposes. Various waveform of the equalized signal ES, the feedback signal FB and the calculating signal CS is within the contemplated scope of the present disclosure.

According to FIG. 4, the waveform of the feedback signal FB is similar to the post-cursor P2 of the equalized signal ES. As mentioned above, in some embodiments, the calculating circuit 206 subtracts the feedback signal FB from the equalized signal ES to generate the calculating signal CS. As shown in FIG. 4, in comparison with the equalized signal ES, the calculating signal CS is narrower. In this situation, the calculating signal CS has a less tendency to have the inter-symbol interference with the pre-cursor of the next symbol. The generation method of the feedback signal FB will be described in detail in the following section.

In some embodiments, the impulse response of the equalization circuit 218 can be obtained from a following equation (1):

$$H(s) = \frac{g}{s + \frac{1}{RC}} \quad (1)$$

wherein H(s) represents the impulse response in frequency domain of the equalization circuit 218, g represents the gain value of the digital to analog convertor 2184, s represents the frequency, and RC represents the aforementioned time constant of the filter circuit 2182.

A following equation (2) is obtained by applying Laplace transform on the equation (1) shown above:

$$h(t) = g \times e^{\frac{-t}{RC}} \quad (2)$$

wherein h(t) represents the impulse response in time domain of the equalization circuit 218. In some embodiments, h(t) is the feedback signal FB.

A following equation (3) is obtained by differentiating the equation (2) shown above:

$$\frac{dh(t)}{dt} = -\frac{g}{RC} \times e^{\frac{-t}{RC}} \quad (3)$$

A following equation (4) is obtained by transpositioning the equation (3) shown above and substituting part of the parameters into the equation (3) shown above:

$$\frac{h(2T) - h(3T)}{T \times h(2T)} \cong \frac{1}{RC} \quad (4)$$

wherein T represents the aforementioned unit interval (UI), h(2T) corresponds to the equalization coefficient h[2] of the equalized signal ES, and h(3T) corresponds to the equalization coefficient h[3] of the equalized signal ES.

In some embodiments, h(t) is the feedback signal FB, h(2T) is the equalization coefficient h[2], and h(3T) is the equalization coefficient h[3]. The following section will describe in detail particularly about how to determine the h(t) in the equation (2) shown above.

In some embodiments, the gain value of the digital to analog convertor 2184 (e.g., the gain value g in the equation (2)) is determined by the equalization coefficient h[1]. For example, the gain value of the digital to analog convertor 2184 equals to the equalization coefficient h[1] of the equalized signal ES. Because the equalization coefficient h[1] has more obvious influence on the pre-cursor of the next symbol, the equalization coefficient h[1] is configured as an amplitude of the impulse response of the equalization circuit 218.

In some embodiments, the time constant of the filter circuit 2182 (e.g., the time constant RC in the equation (2)) is determined by the equalization coefficient h[2] and equalization coefficient h[3]. For example, the time constant of the filter circuit 2182 is determined by the equation (4). Because the slope between the equalization coefficient h[2] and the equalization coefficient h[3] corresponds to an attenuation of the equalized signal ES, in some embodiments, the slope between the equalization coefficient h[2] and the equalization coefficient h[3] configures to determine the attenuation of the impulse response of the equalization circuit 218. Hence, the waveform of the feedback signal FB is closer to the post-cursor P2 of the equalized signal ES.

By subtracting the feedback signal FB from the equalized signal ES, the post-cursor P2 of the equalized signal ES can be eliminated. Therefore, the inter-symbol interference can be decreased. The aforementioned generation method of the feedback signal FB is only given for illustrative purposes. Various generation method of the feedback signal FB is within the contemplated scope of the present disclosure.

In some embodiments, the edge slicer 212 is configured to generate the edge signal $S_{EDGE}$ according to the calculating signal CS. In some embodiments, the edge slicer 212 operates based on the clock signal CLK1. For example, the edge slicer 212 samples the rising edge or the falling edge of the calculating signal CS according to the clock signal CLK1, to generate the edge signal $S_{EDGE}$.

In some embodiments, the clock data recovery circuit 214 is configured to generate the clock signal CLK1 and the clock signal CLK2 according to the edge signal $S_{EDGE}$ and the data signal $S_{DATA}$. In some embodiments, a phase difference between the clock signal CLK1 and the clock signal CLK2 is 90 degree.

In some embodiments, the clock data recovery circuit 214 includes a detector, a loop filter circuit, a phase interpolator and a clock signal generation/modification circuit. The detector receives the edge signal $S_{EDGE}$ and the data signal $S_{DATA}$. The detector detects an error between the edge signal $S_{EDGE}$ and the data signal $S_{DATA}$ to generate an error signal. The loop filter circuit compares the error signal with at least one critical value to generate a control signal. In some embodiments, the at least one critical value includes a frequency critical value and a phase critical value. The phase interpolator generates a modification signal according to the control signal. The clock signal generation/modification circuit generates or modifies the clock signal CLK1 and the clock signal CLK2 according to the modification signal. In some embodiments, the clock signal generation/modification circuit modifies the clock signal CLK1 and the clock signal CLK2 toward the same phase direction according to the modification signal. For example, when the state of the modification signal is "UP", the clock signal generation/modification circuit can modify the clock phase of the clock signal CLK1 and the clock signal CLK2 toward positive. Or, when the state of the modification signal is "DOWN", the clock signal generation/modification circuit can modify the clock phase of the clock signal CLK1 and the clock signal CLK2 toward negative.

The implement of clock data recovery circuit 214 described above is only given for illustrative purposes. Various implements of the clock data recovery circuit 214 are within the contemplated scope of the present disclosure.

In some embodiments, the calculating circuit 216 performs the adaptive algorithm on the data signal $S_{DATA}$ and the error signal $S_{ERR}$ to obtain the reference voltage $V_{REF}$. In some embodiments, the reference voltage $V_{REF}$ is provided to the error slicer 208, and then the error slicer 208 can compare the calculating signal CS with reference voltage $V_{REF}$.

The implement of receiving device 200 described above is only given for purposes. Various implements of the receiving device 200 are within the contemplated scope of the present disclosure.

Figure 5:
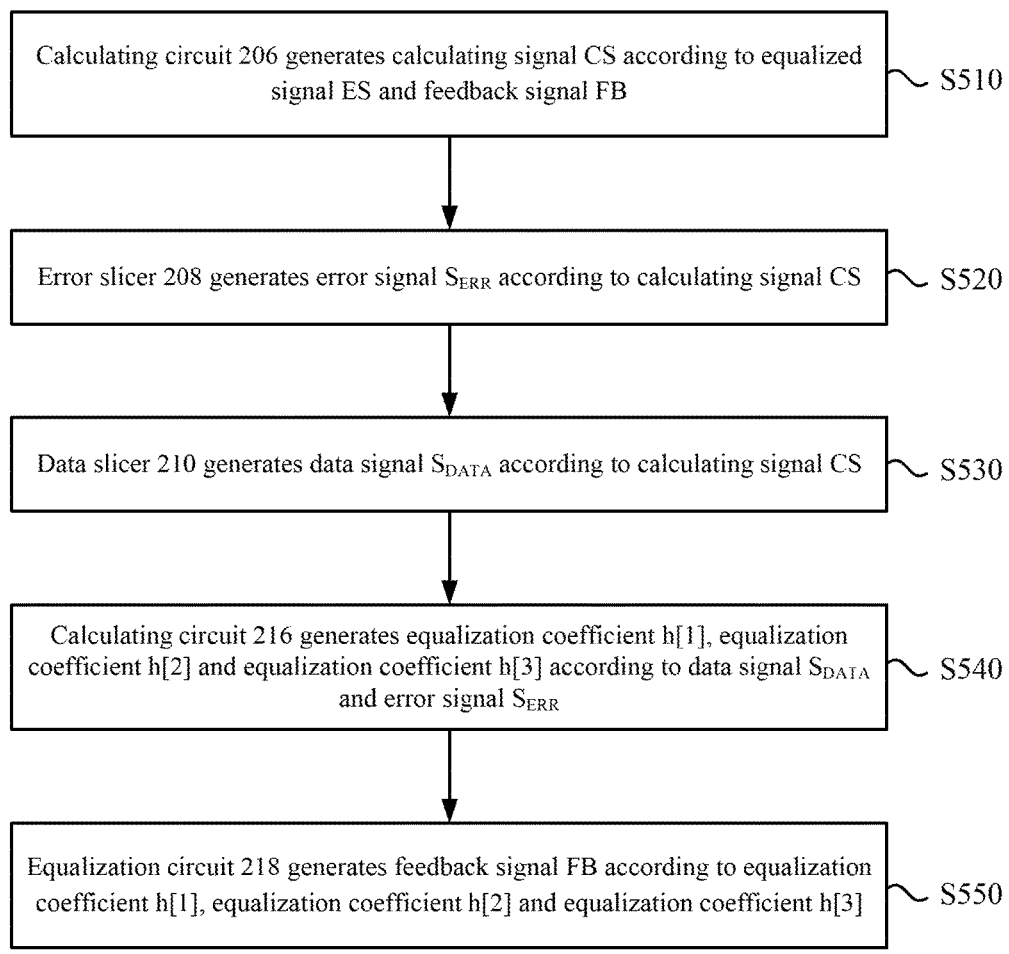
FIG. 5 is a flow chart illustrating a signal conversion method according to some embodiments of the present disclosure.

Reference is made to FIG. 5. FIG. 5 is a flow chart illustrating a signal conversion method 500 according to some embodiments of the present disclosure. The signal conversion method 500 includes a step S510, a step S520, a step S530, a step S540 and a step S550. In some embodiments, the signal conversion method 500 is applied to the receiving device 200 shown in FIG. 2. For a better understanding of the present disclosure, the signal conversion method 500 will be discussed with reference to the receiving device 200 shown FIG. 2 together, but the present disclosure should not be limited to the description of the embodiments contained herein.

In the step S510, the calculating circuit 206 generates the calculating signal CS according to the equalized signal ES and the feedback signal FB. In some embodiments, the calculating circuit 206 subtracts the feedback signal FB from the equalized signal ES to output the calculating signal CS. In some embodiments, the calculating circuit is implemented by an adder.

In the step S520, the error slicer 208 generates the error signal $S_{ERR}$ according to the calculating signal CS. In some embodiments, the error slicer 208 compares the calculating signal CS with the reference voltage $V_{REF}$ to output the error signal $S_{ERR}$.

In the step S530, the data slicer 210 generates data signal $S_{DATA}$ according to the calculating signal CS. In some embodiments, the data slicer 210 compares the calculating signal CS with the middle voltage to output the data signal $S_{DATA}$. In some embodiments, the middle voltage is lower than the reference voltage $V_{REF}$.

In step S540, the calculating circuit 216 generates the equalization coefficient h[1], the equalization coefficient h[2] and the equalization coefficient h[3] according to the data signal $S_{DATA}$ and the error signal $S_{ERR}$. In some embodiments, the calculating circuit 216 performs the least mean square algorithm on the data signal $S_{DATA}$ and the error signal $S_{ERR}$ to obtain the equalization coefficient h[1], the equalization coefficient h[2] and the equalization coefficient h[3]. Various algorithms are within the contemplated scope of the present disclosure.

In step S550, the equalization circuit 218 generates the feedback signal FB according to the equalization coefficient h[1], the equalization coefficient h[2] and the equalization coefficient h[3]. In some embodiments, the equalization circuit 218 includes the filter circuit 2182 and the digital to analog convertor 2184. The filter circuit 2182 corresponds to the time constant, and the digital to analog convertor 2184 corresponds to the gain value. In some embodiments, the time constant is determined by the equalization coefficient h[2] and the equalization coefficient h[3], and the gain value is determined by the equalization coefficient h[1]. In some embodiments, the equalization circuit 218 generates feedback signal FB according to the time constant and the gain value.

The descriptions with respect to the signal conversion method 500 as discussed above include illustrative operations. The operations of the signal conversion method 500 are not necessarily recited in the sequence in which the steps are performed. That is, unless the sequence of the operations is expressly indicated, the sequence of the operations is interchangeable, and all or part of the operations may be simultaneously, partially simultaneously, or sequentially performed, all of which are within the contemplated scope of the present disclosure.

In summary, the receiving device generates the feedback signal based on those equalization coefficients, and generates the calculating signal according to the equalized signal and the feedback signal. Therefore, the inter-symbol interference of the receiving device can be decreased to improve the communication quality.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the contemplated scope of the following claims.

What is claimed is:

1. A receiving device, comprising:
a first calculating circuit, configured to generate a calculating signal according to an equalized signal and a feedback signal;
an error slicer, configured to generate an error signal according to the calculating signal;
a data slicer, configured to generate a data signal according to the calculating signal;
a second calculating circuit, configured to generate a first equalization coefficient, a second equalization coefficient, and a third equalization coefficient according to the data signal and the error signal; and
an equalization circuit, configured to generate the feedback signal according to the first equalization coefficient, the second equalization coefficient, and the third equalization coefficient,
wherein a gain value of the equalization circuit is associated with the first equalization coefficient, and a time constant of the equalization circuit is associated with the second equalization coefficient and the third equalization coefficient.

2. The receiving device of claim 1, wherein an impulse response of the equalization circuit is associated with the first equalization coefficient, the second equalization coefficient, and the third equalization coefficient.

3. The receiving device of claim 1, wherein the first equalization coefficient, the second equalization coefficient, and the third equalization coefficient are associated with a post-cursor of the equalized signal.

4. The receiving device of claim 1, wherein the equalization circuit comprises:

a filter circuit, corresponding to the time constant which is determined by the second equalization coefficient and the third equalization coefficient; and a digital to analog circuit, corresponding to the gain value which is determined by the first equalization coefficient, wherein the equalization circuit outputs the feedback signal according to the time constant and the gain value.

5. The receiving device of claim 4, wherein the time constant is determined by an equation, and the equation is shown as follows:

$$\frac{1}{RC} = \frac{(h[2]-h[3])}{T \times h[2]}$$

wherein RC is the time constant, h[2] is the second equalization coefficient, h[3] is the third equalization coefficient, T is an unit interval, and the unit interval is a data interval of the equalized signal.

6. The receiving device of claim 1, wherein the first equalization coefficient, the second equalization coefficient and the third equalization coefficient correspond to a first time, a second time and a third time of the equalized signal, respectively, the first time and a peak time of the equalized signal have an unit interval therebetween, the second time and the first time have the unit interval therebetween, the third time and the second time have the unit interval therebetween, and the unit interval is the data interval of the equalized signal.

7. The receiving device of claim 1, further comprising:
an edge slicer, configured to generate an edge signal according to the calculating signal; and
a clock data recovery circuit, configured to generate a first clock signal and a second clock signal according to the data signal and the edge signal,
wherein the first clock signal is transmitted to the edge slicer, the second clock signal is transmitted to the data slicer, and a phase difference between the first clock signal and the second clock signal is 90 degree.

8. A signal conversion method, comprising:
generating a calculating signal by a first calculating circuit according to an equalized signal and a feedback signal;
generating an error signal by an error slicer according to the calculating signal;
generating a data signal by a data slicer according the calculating signal,
generating a first equalization coefficient, a second equalization coefficient, and a third equalization coefficient by a second calculating circuit according to the data signal and the error signal; and
generating the feedback signal by an equalization circuit according to the first equalization coefficient, the second equalization coefficient, and the third equalization coefficient, wherein a gain value of the equalization circuit is associated with the first equalization coefficient, and a time constant of the equalization circuit is associated with the second equalization coefficient and the third equalization coefficient.

9. The signal conversion method of claim 8, wherein an impulse response of the equalization circuit is associated with the first equalization coefficient, the second equalization coefficient, and the third equalization coefficient.

10. The signal conversion method of claim 8, wherein the first equalization coefficient, the second equalization coefficient, and the third equalization coefficient are associated with a post-cursor of the equalized signal.

11. The signal conversion method of claim 8, wherein generating the feedback signal comprises:
outputting the feedback signal by the equalization circuit according to the time constant and the gain value,
wherein the time constant corresponds to a filter circuit and the time constant is determined by the second equalization coefficient and the third equalization coefficient, the gain value corresponds to a digital to analog circuit and the gain value is determined by the first equalization coefficient.

12. The signal conversion method of claim 11, wherein the time constant is determined by an equation, wherein the equation is shown as follows:

$$\frac{1}{RC} = \frac{(h[2]-h[3])}{T \times h[2]}$$

wherein RC is the time constant, h[] is the second equalization coefficient, h[3] is the third equalization coefficient, T is an unit interval, and the unit interval is a data interval of the equalized signal.

13. The signal conversion method of claim 8, wherein the first equalization coefficient, the second equalization coefficient and the third equalization coefficient correspond to a first time, a second time and a third time of the equalized signal, respectively, the first time and a peak time of the equalized signal have an unit interval therebetween, the second time and the first time have the unit interval therebetween, the third time and the second time have the unit interval therebetween, and the unit interval is the data interval of the equalized signal.

14. The signal conversion method of claim 8, further comprising:
generating an edge signal by an edge slicer according to the calculating signal; and
generating a first clock signal and a second clock signal by a clock data recovery circuit according to the data signal and the edge signal,
wherein the first clock signal is transmitted to the edge slicer, the second clock signal is transmitted to the data slicer, and a phase difference between the first clock signal and the second clock signal is 90 degree.

* * * * *